United States Patent
Zhang et al.

(10) Patent No.: US 9,756,545 B2
(45) Date of Patent: Sep. 5, 2017

(54) METHOD AND APPARATUS FOR PERFORMING COMPONENT CARRIER-SPECIFIC RECONFIGURATION

(71) Applicant: InterDigital Patent Holdings, Inc., Wilmington, DE (US)

(72) Inventors: Guodong Zhang, Syosset, NY (US); Kyle Jung-Lin Pan, Saint James, NY (US); Jean-Louis Gauvreau, La Prairie (CA); Stephen E. Terry, Northport, NY (US); Sung-Hyuk Shin, Northvale, NJ (US); Paul Marinier, Brossard (CA); Shankar Somasundaram, Sunnyvale, CA (US); Philip J. Pietraski, Jericho, NY (US); Robert L. Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/174,302

(22) Filed: Jun. 6, 2016

(65) Prior Publication Data
US 2016/0286455 A1  Sep. 29, 2016

Related U.S. Application Data

(63) Continuation of application No. 14/497,481, filed on Sep. 26, 2014, now abandoned, which is a
(Continued)

(51) Int. Cl.
*H04W 36/30* (2009.01)
*H04L 5/00* (2006.01)
(Continued)

(52) U.S. Cl.
CPC ............ *H04W 36/30* (2013.01); *H04B 7/024* (2013.01); *H04L 5/0035* (2013.01); *H04W 24/10* (2013.01);
(Continued)

(58) Field of Classification Search
None
See application file for complete search history.

(56) References Cited

U.S. PATENT DOCUMENTS 8,908,560 B2 12/2014 Maeda et al.
2005/0176469 A1* 8/2005 Stern-Berkowitz ... H04W 36/30
455/562.1
(Continued)

FOREIGN PATENT DOCUMENTS

CN 101296028 10/2008
CN 101478808 7/2009

OTHER PUBLICATIONS

Catt et al., "Carrier Aggregation for LTE-A," 3GPP TSG RAN WG1 meeting #55bis, R1-090187 (Jan. 12-16, 2009).
(Continued)

*Primary Examiner* — Mohammad Adhami
(74) *Attorney, Agent, or Firm* — Volpe and Koenig, P.C.

(57) ABSTRACT

Methods and apparatus are described. A method, implemented in a wireless transmit/receive unit (WTRU), includes receiving a single radio resource control (RRC) connection reconfiguration request. The single RRC connection reconfiguration request includes individually, for each of a plurality of cells, physical configuration information. One of the plurality of cells is a primary cell and other cells of the plurality of cells are non-primary cells. Measurement configuration information is received that config-
(Continued)

ures the WTRU to send a measurement report on a condition that a neighboring cell is better than a non-primary cell by an amount.

13 Claims, 10 Drawing Sheets

Related U.S. Application Data continuation of application No. 12/722,872, filed on Mar. 12, 2010, now Pat. No. 8,873,505.

(60) Provisional application No. 61/159,606, filed on Mar. 12, 2009.

(51) Int. Cl.
- H04W 36/00 (2009.01)
- H04W 76/04 (2009.01)
- H04W 74/08 (2009.01)
- H04B 7/024 (2017.01)
- H04W 24/10 (2009.01)
- H04W 72/08 (2009.01)

(52) U.S. Cl.
CPC ... H04W 36/0072 (2013.01); H04W 74/0833 (2013.01); H04W 76/046 (2013.01); H04W 76/048 (2013.01); H04W 36/0066 (2013.01); H04W 72/085 (2013.01)

(56) References Cited

U.S. PATENT DOCUMENTS

| | | | | |
|---|---|---|---|---|
| 2008/0268833 | A1* | 10/2008 | Huang | H04B 7/024 455/425 |
| 2008/0310389 | A1 | 12/2008 | Suzuki et al. | |
| 2009/0180414 | A1 | 7/2009 | Maeda et al. | |
| 2009/0247150 | A1* | 10/2009 | Fischer | H04W 24/10 455/425 |
| 2009/0270108 | A1* | 10/2009 | Xu | H04W 72/085 455/452.2 |
| 2009/0310563 | A1* | 12/2009 | Chou | H04L 27/0006 370/331 |
| 2010/0027503 | A1* | 2/2010 | Eravelli | H04W 36/02 370/331 |
| 2010/0124201 | A1* | 5/2010 | Griot | H04W 36/06 370/331 |
| 2010/0165835 | A1* | 7/2010 | Hsu | H04W 76/027 370/225 |
| 2010/0309996 | A1* | 12/2010 | Lim | H04B 7/024 375/260 |
| 2011/0183669 | A1 | 7/2011 | Kazmi | |
| 2012/0009963 | A1 | 1/2012 | Kim et al. | |
| 2013/0178221 | A1 | 7/2013 | Jung et al. | |

OTHER PUBLICATIONS

CMCC, "Resource Allocation and PDCCH Design Issues in Carrier Aggregation," 3GPP TSG-RAN WG1 #56, R1-090924 (Feb. 9-13, 2009).
CMCC, "Resource Allocation and PDCCH Design Issues in Carrier Aggregation," 3GPP TSG-RAN WG1 #55bis, R1-090337 (Jan. 12-16, 2009).
Ericsson, "Carrier aggregation in LTE-Advanced," TSG-RAN WG1 #53bis, R1-082468 (Jun. 30-Jul. 4, 2008).
Ericsson, "Carrier aggregation," TSG-RAN WG1 #54bis, R1-083750 (Sep. 29-Oct. 3, 2008).
Ericsson, "LTE-Advanced—Coordinated Multipoint transmission/reception," TSG-RAN WG1 #53bis, R1-082469, Warsaw, Poland (Jun. 30-Jul. 4, 2008).
Fujitsu, "Anchor component carrier and preferred control signal structure," 3GPP TSG-RAN1 #56, R1-090952 (Jan. 9-13, 2009).
Fujitsu, "Anchor component carrier," 3GPP TSG-RAN1 #55bis, R1-090382 (Jan. 2009).
Huawei, "Carrier aggregation in Advanced E-UTRA," 3GPP TSG RAN WG1#53bis, R1-082448 (Jun. 30-Jul. 4, 2008).
Huawei, "Consideration on carrier aggregation for home eNB," 3GPP TSG RAN WG1 meeting #56, R1-090817 (Feb. 9-13, 2009).
LG Electronics, "Resolving downlink carrier ambiguity with RACH," 3GPP TSG RAN WG1#56, R1-090780 (Feb. 9-13, 2009).
NEC Group, "Downlink Control Structure for LTE-Advanced System," TSG-RAN WG1#56, R1-090647 (Feb. 2009).
Texas Instruments, "Issues on Carrier Aggregation for Advanced E-UTRA," 3GPP TSG RAN WG1 #55bis, R1-090280 (Jan. 2009).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.3.0 (Sep. 2008).
Third Generation Partnership Project, "Technical Specification Group Radio Access Network; Evolved Universal Terrestrial Radio Access (E-UTRA); Physical layer procedures (Release 9)," 3GPP TS 36.213 V9.0.1 (Dec. 2009).
Third Generation Partnership Project, "Technical Specification Group Radio Access Network; Evolved Universal Terrestrial Radio Access (E-UTRA); Physical layer procedures (Release 8)," 3GPP TS 36.213 V8.5.0 (Dec. 2008).
Third Generation Partnership Project, "Technical Specification Group Radio Access Network; Evolved Universal Terrestrial Radio Access (E-UTRA) Medium Access Control (MAC) protocol specification (Release 9)," 3GPP TS 36.321 V9.1.0 (Dec. 2009).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.4.0 (Dec. 2008).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.11.0 (Dec. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.7.0 (Dec. 2008).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.2.0 (Dec. 2009).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.8.0 (Dec. 2009).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.4.0 (Dec. 2008).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.8.0 (Dec. 2010).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.1.0 (Dec. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.5.0 (May 2008).
CATT, "Impact of CoMP to RRC Specification," 3GPP TSG RAN WG2 Meeting #66, R2-092990, San Francisco, USA (May 4-9, 2009).

(56) References Cited

OTHER PUBLICATIONS

Ericsson, "Analysis of Rrm Requirements for 3 DL/2UL CA," 3GPP TSG-RAN WG4 Meeting #75, R4-152984, Fukuoka, Japan (May 25-29, 2015).
Huawei, "Measurement Consideration in CA," 3GPP TSG-RAN2 #68 meeting, R2-096495, Jeju, Korea (Nov. 9-13, 2009).
LG Electronics, Inc., "Measurement configuration structure for carrier aggregation," 3GPP TSG-RAN2 Meeting #67, R2-094966, Shenzhen, China (Aug. 24-28, 2009).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.5.0 (Mar. 2009).
ZTE, "Measurement configuration in CA," 3GPP TSG-RAN WG2 Meeting #66bis, R2-093885, Los Angeles, USA (Jun. 29-Jul. 3, 2009).

* cited by examiner

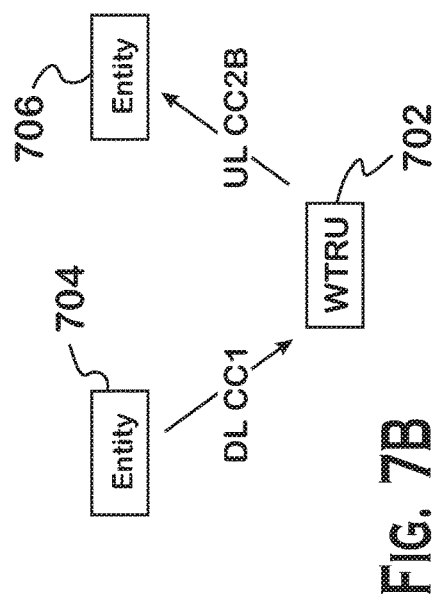
FIG. 7A
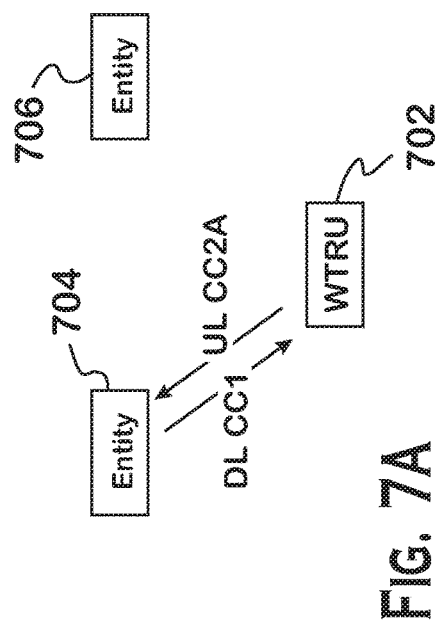
FIG. 7B
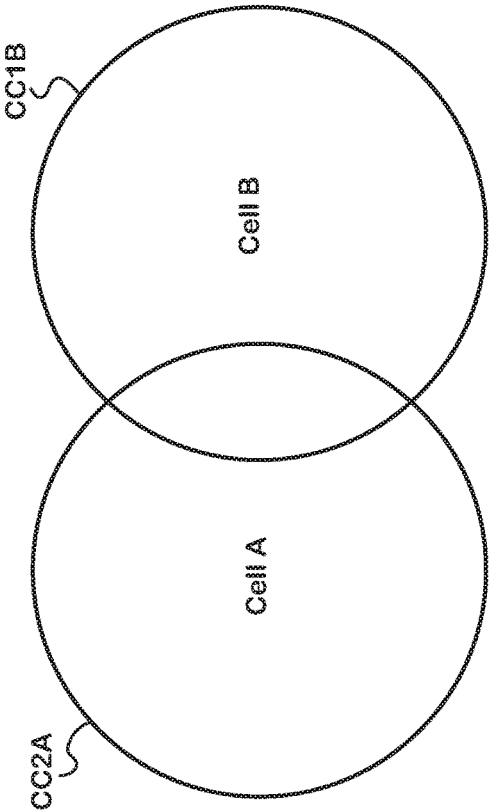
FIG. 8
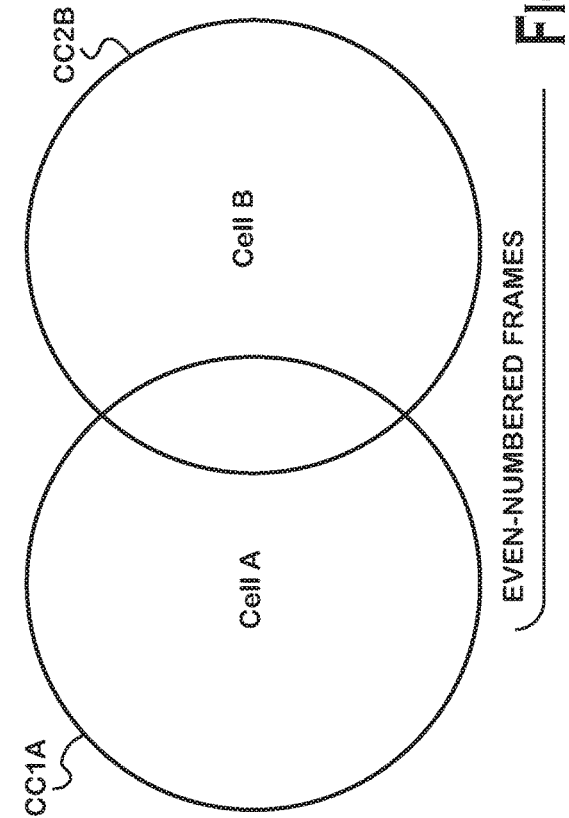

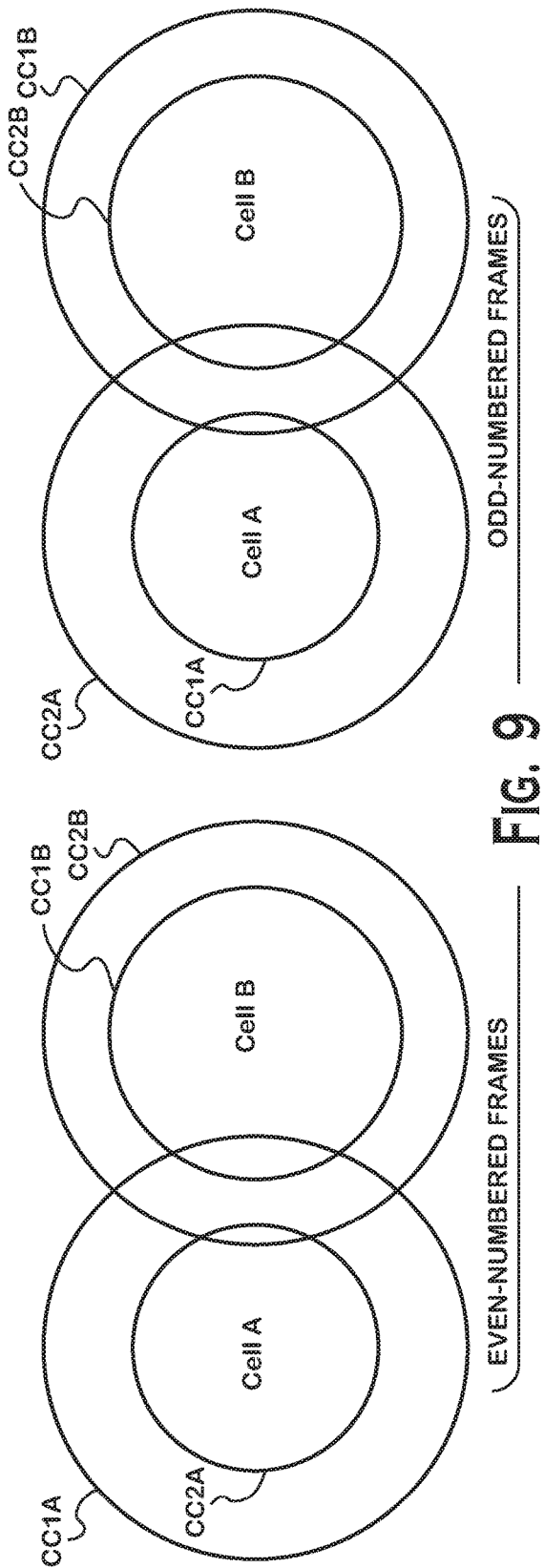
FIG. 9
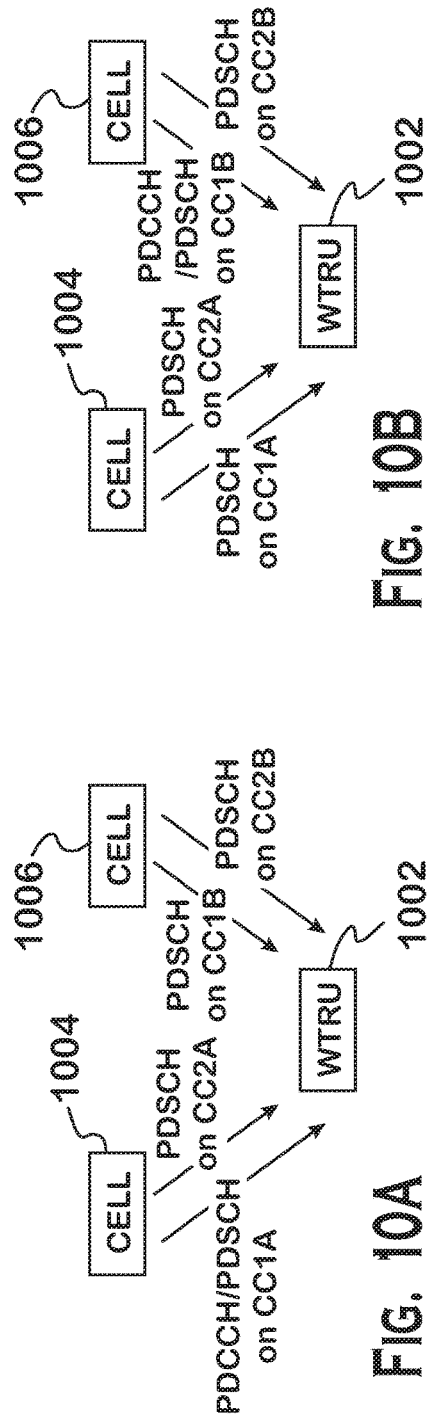
FIG. 10A
FIG. 10B

METHOD AND APPARATUS FOR PERFORMING COMPONENT CARRIER-SPECIFIC RECONFIGURATION

CROSS REFERENCE TO RELATED APPLICATIONS

This application is a continuation of U.S. patent application Ser. No. 14/497,481, filed Sep. 26, 2014, which is a continuation of U.S. patent application Ser. No. 12/722,872, filed Mar. 12, 2010, which issued as U.S. Pat. No. 8,873,505 on Oct. 28, 2014, which claims the benefit of U.S. Provisional Application No. 61/159,606 filed Mar. 12, 2009, the contents of which are hereby incorporated by reference herein.

FIELD OF INVENTION

This application is related to wireless communications.

BACKGROUND

In order to support higher data rate and spectrum efficiency, new wireless technologies have been introduced. For example, the third generation partnership project (3GPP) long term evolution (LTE) system has been introduced into 3GPP Release 8 (R8).

The LTE downlink (DL) transmission is based on orthogonal frequency division multiple access (OFDMA) air interface, and the LTE uplink (UL) transmission is based on single-carrier (SC) DFT-spread OFDMA (DFT-S-OFDMA). The use of single-carrier transmission in the UL is motivated by the lower peak-to-average power ratio (PAPR) compared to multi-carrier transmission such as orthogonal frequency division multiplex (OFDM). For flexible deployment, the 3GPP R8 LTE systems support scalable transmission bandwidths of either 1.4, 2.5, 5, 10, 15 or 20 MHz. The R8 LTE system may operate in either frequency division duplex (FDD), time division duplex (TDD) or half-duplex FDD modes.

In the R8 LTE system, each radio frame (10 ms) consists of 10 equally sized sub-frames of 1 ms. Each sub-frame consists of 2 equally sized timeslots of 0.5 ms each. There may be either 7 or 6 OFDM symbols per timeslot. 7 symbols per timeslot are used with a normal cyclic prefix, and 6 symbols per timeslot are used with an extended cyclic prefix. The sub-carrier spacing for the R8 LTE system is 15 kHz. An alternative reduced sub-carrier spacing mode using 7.5 kHz is also possible. A resource element (RE) corresponds to one (1) sub-carrier during one (1) OFDM symbol interval. 12 consecutive sub-carriers during a 0.5 ms timeslot constitute one (1) resource block (RB). Therefore, with 7 symbols per timeslot, each RB consists of 12×7=84 REs. A DL carrier may comprise scalable number of RBs, ranging from a minimum of 6 RBs up to a maximum of 110 RBs. This corresponds to an overall scalable transmission bandwidth of roughly 1 MHz up to 20 MHz. Normally, a set of common transmission bandwidths is specified, (e.g., 1.4, 3, 5, 10, or 20 MHz). The basic time-domain unit for dynamic scheduling in LTE is one sub-frame consisting of two consecutive timeslots. Certain sub-carriers on some OFDM symbols are allocated to carry pilot signals in the time-frequency grid.

In the R8 LTE DL direction, a wireless transmit/receive unit (WTRU) may be allocated by the evolved Node-B (eNB) to receive its data anywhere across the whole LTE transmission bandwidth. In the R8 LTE UL direction, a WTRU may transmit on a limited, yet contiguous set of assigned sub-carriers in an FDMA arrangement. This is called single carrier (SC) FDMA. For example, if the overall OFDM signal or system bandwidth in the UL is composed of sub-carriers numbered 1 to 100, a first WTRU may be assigned to transmit its own signal on sub-carriers 1-12, a second WTRU may transmit on sub-carriers 13-24, and so on. An eNB would receive the composite UL signals across the entire transmission bandwidth normally from a plurality of WTRUs at the same time, but each WTRU would transmit in a subset of the available transmission bandwidth. Frequency hopping may be applied in UL transmissions by a WTRU.

In order to further improve achievable throughput and coverage of LTE-based radio access systems, and in order to meet the IMT-Advanced requirements of 1 Gbps and 500 Mbps in the DL and UL directions, respectively, LTE-Advanced (LTE-A) is currently under study in 3GPP standardization body. One major improvement proposed for LTE-A is the carrier aggregation and support of flexible bandwidth arrangement. It would allow DL and UL transmission bandwidths to exceed 20 MHz in R8 LTE, (e.g., 40 MHz), and allow for more flexible usage of the available paired carriers. For example, whereas R8 LTE is limited to operate in symmetrical and paired FDD mode, (e.g., DL and UL are both 10 MHz or 20 MHz transmission bandwidth each), LTE-A would be able to operate in asymmetric configurations, for example DL 10 MHz paired with UL 5 MHz. In addition, composite aggregate transmission bandwidths may be possible with LTE-A, (e.g., DL a first 20 MHz component carrier+a second 10 MHz component carrier paired with an UL 20 MHz component carrier). The composite aggregate transmission bandwidths may not necessarily be contiguous in frequency domain. Alternatively, operation in contiguous aggregate transmission bandwidths may also be possible, (e.g., a first DL component carrier (CC) of 15 MHz is aggregated with another 15 MHz DL component carrier and paired with a UL component carrier of 20 MHz).

FIG. 1A shows discontinuous spectrum aggregation and FIGS. 1B and 1C show continuous spectrum aggregation. The LTE R8 UL transmission format uses DFT-S OFDM using a DFT precoder. The DFT precoder may be applied to the aggregate bandwidth, (i.e., across all the component carriers), in case the bandwidths are contiguous, as shown in FIG. 1B. Alternatively, the DFT precoder may be applied per component carrier, (e.g., up to 110 RBs or 20 MHz maximum), as shown in FIG. 1C.

FIGS. 2A and 2B show an intra-mobility management entity (MME)/serving gateway handover procedure in LTE R8. In LTE R8, hard handover is used and handover procedure is restricted to one carrier, (i.e., one component carrier).

An eNB is provided with a WTRU context including information regarding roaming restrictions either at connection establishment or at the last tracking area (TA) update (step 102). The source eNB configures the WTRU measurement procedures according to the area restriction information (step 104). Measurements provided by the source eNB may assist the function controlling the WTRU's connection mobility.

The WTRU gets uplink allocation for transmission of a measurement report, which is triggered by the rules set by, for example, system information, specification, etc. (step 106), and transmits a measurement report to the source eNB once triggered (step 108).

The source eNB makes a handover decision based on the measurement report and radio resource management (RRM)

information (step 110). The source eNB issues a handover request message to the target eNB at step 112 passing the necessary information to prepare the handover at the target eNB including WTRU X2 signaling context reference at the source eNB, WTRU S1 EPC signaling context reference, target cell identity (ID), $K_{eNB}$, RRC context including the cell radio network temporary identity (C-RNTI) of the WTRU in the source eNB, access stratum (AS)-configuration, EUTRAN radio access bearer (E-RAB) context and physical layer ID of the source cell+medium access control (MAC) for possible radio link failure (RLF) recovery), or the like. The WTRU X2/WTRU S1 signaling references enable the target eNB to address the source eNB and the evolved packet core (EPC). The E-RAB context includes necessary radio network layer (RNL) and transport network layer (TNL) addressing information, and quality of service (QoS) profiles of the E-RABs.

The target eNB may perform the admission control dependent on the received E-RAB QoS information to increase the likelihood of a successful handover, if the resources may be granted by target eNB (step 114). The target eNB configures the required resources according to the received E-RAB QoS information and reserves a C-RNTI and optionally a random access channel (RACH) preamble. The AS-configuration to be used in the target cell may either be specified independently (i.e., an "establishment") or as a delta compared to the AS-configuration used in the source cell (i.e., a "reconfiguration").

The target eNB prepares handover with layer 1 and layer 2 and sends a handover request acknowledgement to the source eNB (step 116). The handover request acknowledgement message includes a transparent container to be sent to the WTRU as an RRC message to perform the handover. The container includes a new C-RNTI, and target eNB security algorithm identifiers for the selected security algorithms. The container may optionally include a dedicated RACH preamble, and some other parameters, for example access parameters, system information blocks (SIBs), etc. The handover request acknowledgement message may also include RNL/TNL information for the forwarding tunnels, if necessary. As soon as the source eNB receives the handover request acknowledgment message, or as soon as the transmission of the handover command is initiated in the downlink, data forwarding may be initiated.

The source eNB generates an RRC message, (i.e., RRC-ConnectionReconfiguration message including the mobilityControlInformation towards the WTRU), and sends the RRC message to the WTRU (step 118). The WTRU receives the RRCConnectionReconfiguration message with the necessary parameters (i.e., new C-RNTI, target eNB security algorithm identifiers, and optionally dedicated RACH preamble, target eNB SIBS, etc.) and detaches from the source cell and synchronizes to the target cell (step 120).

The source eNB delivers buffered and in-transit packets to the target eNB (step 122), and sends the SN STATUS TRANSFER message to the target eNB to convey the uplink packet data convergence protocol (PDCP) sequence number (SN) receiver status and the downlink PDCP SN transmitter status of E-RABs for which PDCP status preservation applies (i.e., for radio link control (RLC) acknowledged mode (AM)) (step 124). The uplink PDCP SN receiver status includes at least the PDCP SN of the first missing UL service data unit (SDU) and may include a bit map of the receive status of the out of sequence UL SDUs that the WTRU needs to retransmit in the target cell, if there are any such SDUs. The downlink PDCP SN transmitter status indicates the next PDCP SN that the target eNB may assign to new SDUs, not having a PDCP SN yet. The source eNB may omit sending this message if none of the E-RABs of the WTRU may be treated with PDCP status preservation.

After receiving the RRCConnectionReconfiguration message including the mobilityControlInformation, the WTRU performs synchronization to the target eNB and accesses the target cell via RACH following a contention-free procedure if a dedicated RACH preamble was allocated in the handover command or following a contention-based procedure if no dedicated preamble was allocated (step 126).

The target eNB responds with UL allocation and timing advance (step 128). When the WTRU has successfully accessed the target cell, the WTRU sends the RRC ConnectionReconfigurationComplete message (C-RNTI) to confirm the handover along with an uplink buffer status report to the target eNB to indicate that the handover procedure is completed for the WTRU (step 130). The target eNB verifies the C-RNTI sent in the handover confirm message. The target eNB can now begin sending data to the WTRU.

The target eNB sends a path switch message to the MME to inform that the WTRU has changed a cell (step 132). The MME sends a user plane update request message to the serving gateway (step 134). The serving gateway switches the downlink data path to the target side, and sends one or more "end marker" packets on the old path to the source eNB and then may release any U-plane/TNL resources towards the source eNB (step 136).

The serving gateway sends a user plane update response message to the MME (step 138). The MME confirms the path switch message with the path switch acknowledgment message (step 140). By sending the WTRU context release message, the target eNB informs success of handover to the source eNB and triggers the release of resources (step 142). Upon reception of the WTRU context release message, the source eNB may release radio and C-plane related resources associated to the WTRU context (step 144). Data packet is then transmitted via the target eNB.

In the above conventional LTE R8 handover procedure, the measurements currently defined to support LTE Rel-8 handover are not sufficient to support handover of an aggregation of component carriers in LTE-A since a single carrier is implicitly assumed in Rel8. In addition, handover of an entire carrier aggregation would be problematic. For example, the relative quality of each component carrier may not necessarily be the same from each cell and so the best handover time for each component carrier would not be simultaneous.

SUMMARY

Embodiments for component carrier-specific reconfiguration are disclosed. A WTRU may perform component carrier reconfiguration on a component carrier basis to add, remove or replace a component carrier(s). Discontinuous reception (DRX) and/or discontinuous transmission (DTX) may be performed on at least one component carrier, wherein DRX and/or DTX patterns on the component carriers may not overlap each other. A random access procedure may be performed at the target cell on one component carrier while other component carriers are inactive. The component carrier-specific reconfiguration or handover of a component carrier or a channel may be implemented in coordinated multiple point transmission (CoMP), wherein a handover of a control channel, not a traffic channel, may be performed. Alternatively, a handover of a traffic channel may be performed.

Embodiments for RRC connection signaling are also disclosed to support the component carrier-specific reconfiguration for the WTRU that may be communicating with different eNBs at the same time.

Embodiments for acquiring master information block (MIB) and system information block (SIB) for component carrier-specific reconfiguration operation are also disclosed.

Embodiments for measurements to support the component carrier-specific reconfiguration and random access procedure in component carrier-specific reconfiguration are also disclosed.

BRIEF DESCRIPTION OF THE DRAWINGS

A more detailed understanding may be had from the following description, given by way of example in conjunction with the accompanying drawings wherein:

FIGS. 7A and 7B show another example component carrier-specific handover in accordance with another embodiment;

FIG. 8 shows an example per-component carrier-DTX/DRX operation in accordance with one embodiment;

FIG. 9 shows another example per-component carrier-DTX/DRX operation in accordance with another embodiment;

FIGS. 10A and 10B show an example component carrier-specific handover when CoMP is implemented in accordance with one embodiment;

DETAILED DESCRIPTION

Figure 1A:
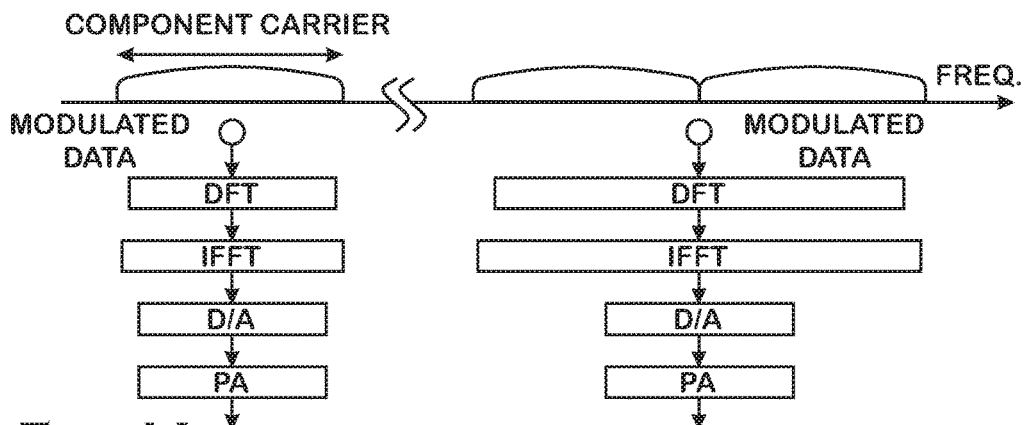
FIG. 1A shows discontinuous spectrum aggregation.
Figure 1B:
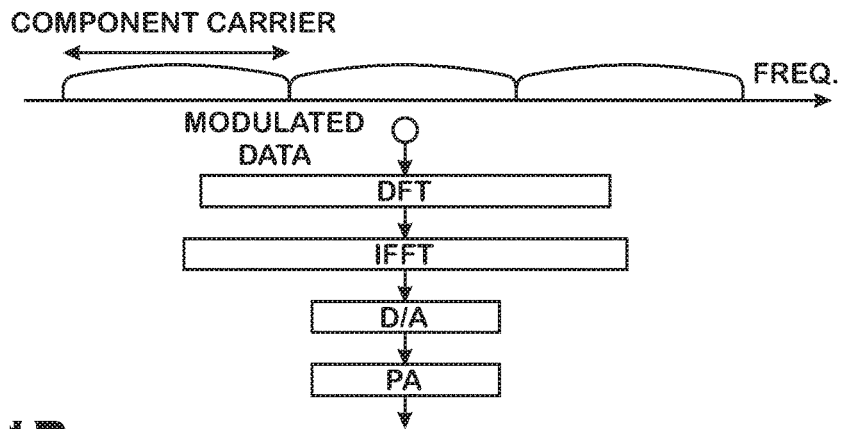
FIGS. 1B and 1C show continuous spectrum aggregation.
Figure 1C:
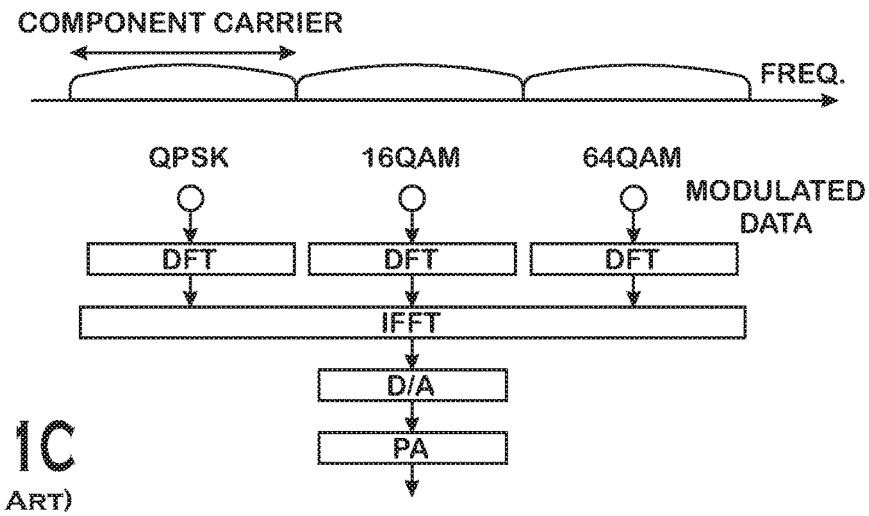

When referred to hereafter, the terminology "WTRU" includes but is not limited to a user equipment (UE), a mobile station, a fixed or mobile subscriber unit, a pager, a cellular telephone, a personal digital assistant (PDA), a computer, a machine-to-machine (M2M) device, a sensor, or any other type of device capable of operating in a wireless environment. When referred to hereafter, the terminology "eNB" includes but is not limited to a Node-B, a base station, a site controller, an access point (AP), or any other type of interfacing device capable of operating in a wireless environment.

When referred to hereafter, the terminology "cell" is used to indicate the site (including "sector") which one or more component carriers may be transmitted to and/or received from and may be uniquely identified, for example, by having a distinguishable pilot signal.

Adding, removing, or replacing a component carrier may or may not change the cell that the WTRU is connected to. A WTRU may receive, (or transmit), via multiple component carriers, and the component carriers may or may not be from, (or directed to), the same cell. When the WTRU is configured with a group of component carriers, the WTRU may be connected to a single cell, or may be connected to more than one cell. The WTRU may determine the cell it is connected to from one of the configured component carriers, (e.g., the anchor or primary component carrier). From the WTRU perspective, a cell may be considered an individual component carrier or a group of component carriers.

The WTRU may receive multiple component carriers from either the same eNode-B or different eNode-Bs and in either case the component carriers are considered as different component carriers having different identities even though the physical frequency bands are the same.

When referred to hereafter, the terminology "component carrier reconfiguration" includes adding a new component carrier, removing a currently configured component carrier, and/or replacing a currently configured component carrier with a new component carrier, and may include "handover" from one cell to another (removing one component carrier in a source cell and adding a new component carrier in a target cell in either the same or different frequency bands). The newly added component carrier (including the newly switched component carrier) may be on either the same eNB or different eNBs and after the component carrier reconfiguration the WTRU may establish links to the same or different eNBs.

Even though the embodiments are disclosed with reference to control channels and data channels associated to 3GPP LTE or LTE-A, it should be noted that the embodiments are not limited to 3GPP LTE or LTE-A, but applicable to any wireless communication technologies that are currently existing or will be developed in the future including, but not limited to, 3GPP high speed packet access (HSPA), cdma2000, IEEE 802.xx, etc. It should also be noted that the embodiments described herein may be applicable in any order or combinations.

Figure 2A:
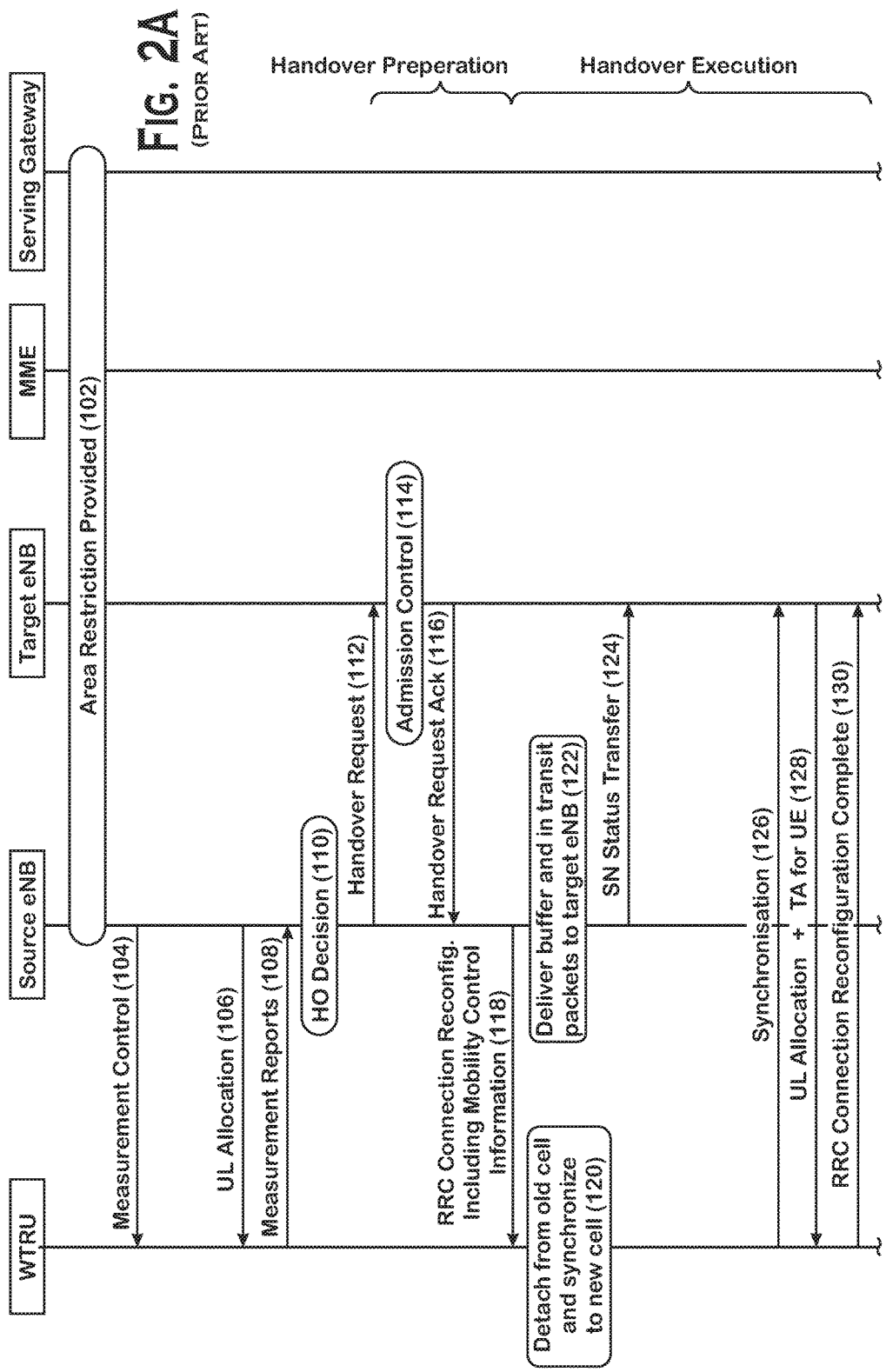
FIGS. 2A and 2B show an intra-mobility management entity (MME)/serving gateway handover procedure in LTE.
Figure 2B:
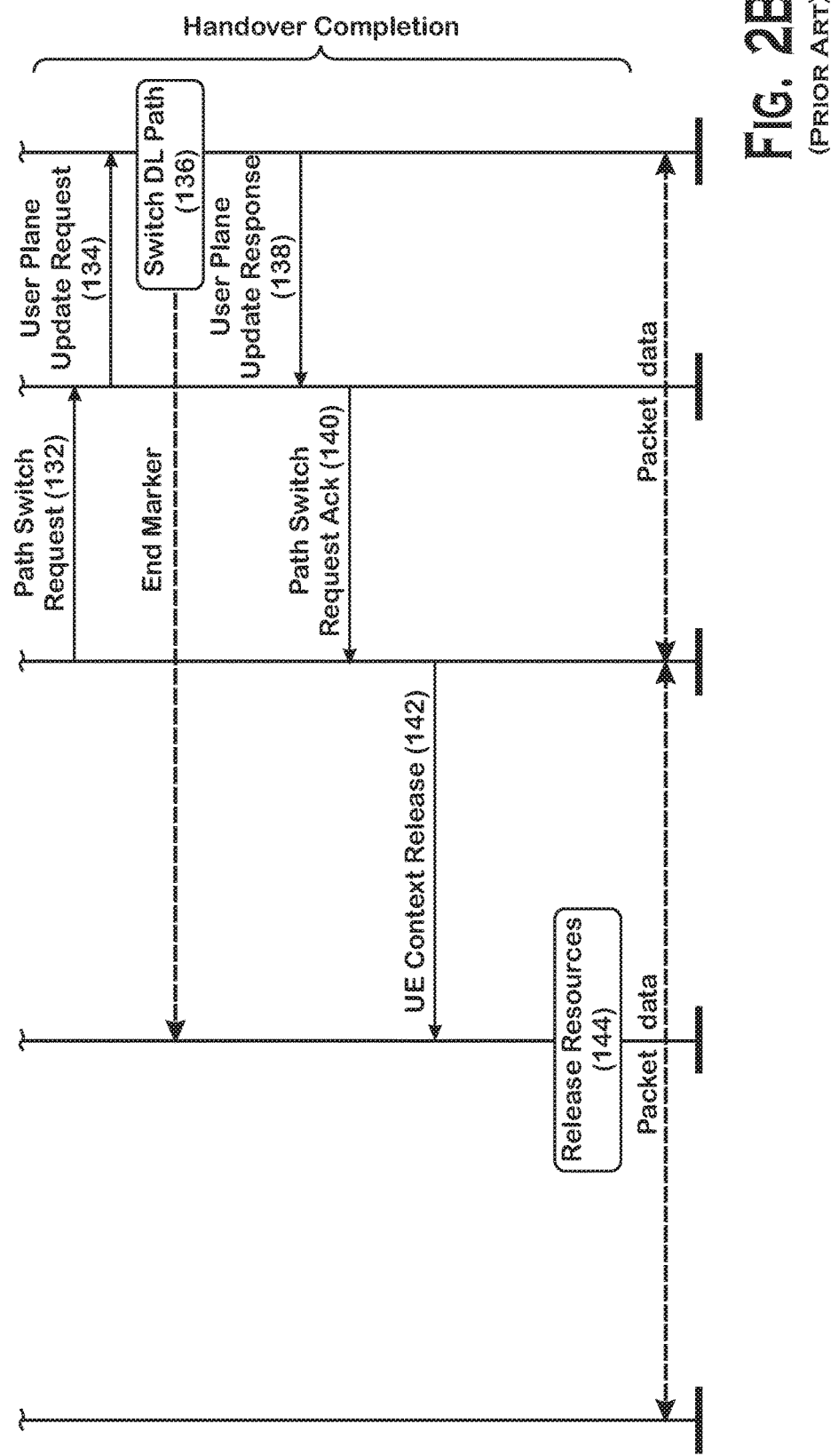
Figure 3:
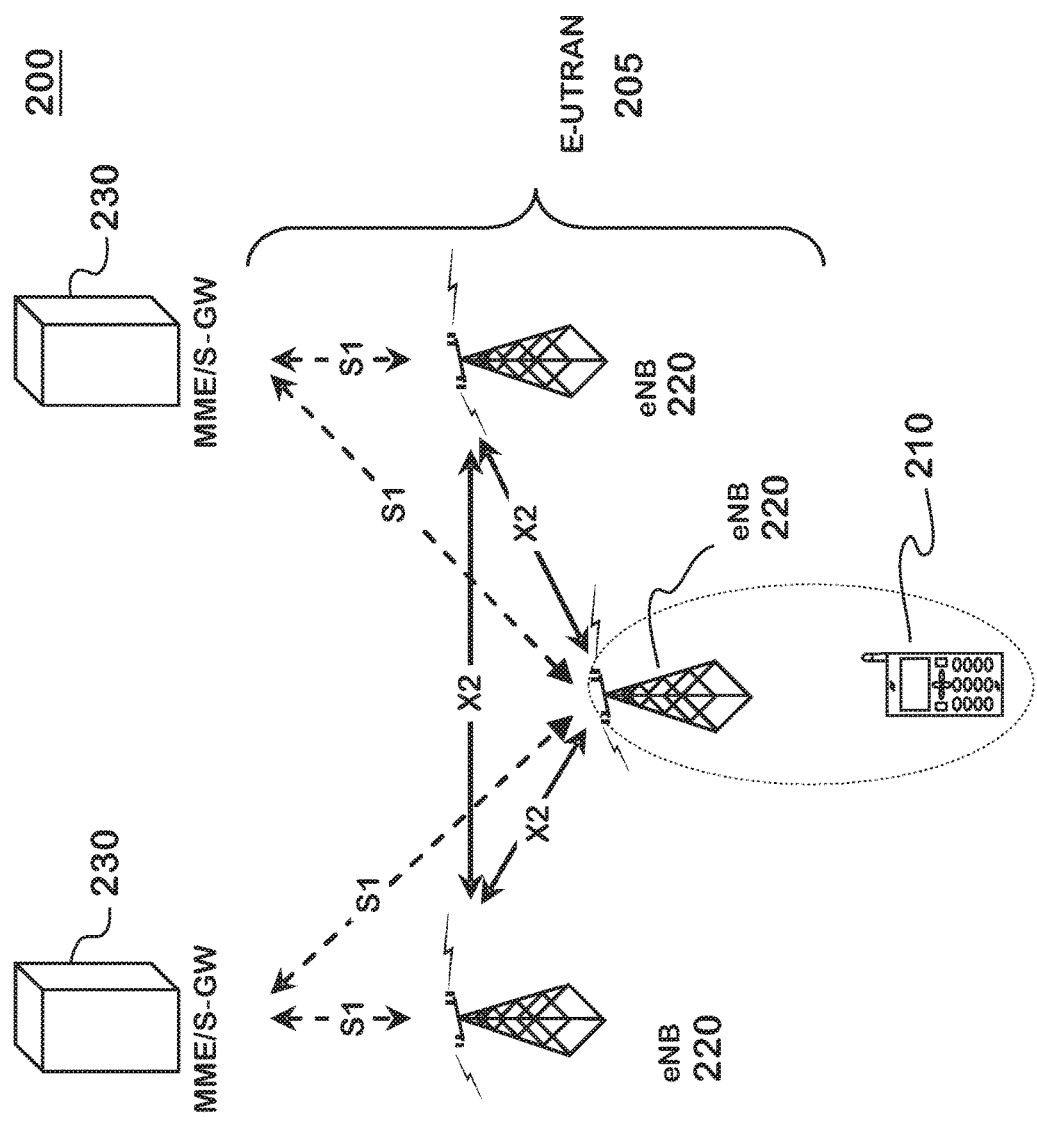
FIG. 3 shows an LTE wireless communication system/access network that includes an Evolved-Universal Terrestrial Radio Access Network (E-UTRAN)

FIG. 3 shows an LTE wireless communication system/access network 200 that includes an Evolved-Universal Terrestrial Radio Access Network (E-UTRAN) 205. The E-UTRAN 205 includes several eNBs 220. The WTRU 210 is in communication with an eNB 220. The eNBs 220 interface with each other using an X2 interface. Each of the eNBs 220 interface with a Mobility Management Entity (MME)/Serving GateWay (S-GW) 230 through an S1 interface. Although a single WTRU 210 and three eNBs 220 are shown in FIG. 2, it should be apparent that any combination of wireless and wired devices may be included in the wireless communication system access network 200 including relays with no wired connections and network devices that do not have the interfaces depicted in FIG. 3, (e.g., a home eNode-B (HeNB) that has no X2 interface.

Figure 4:
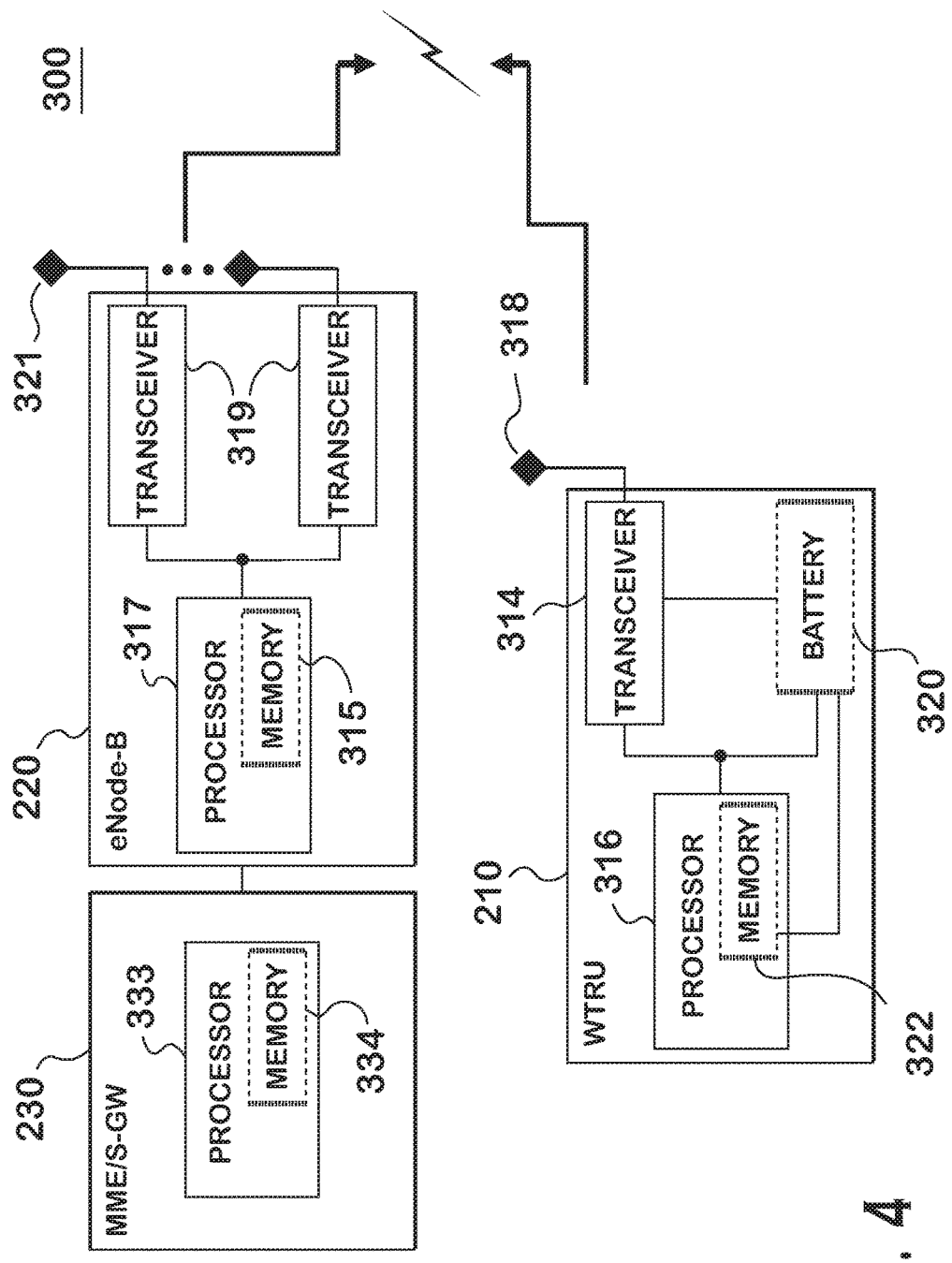
FIG. 4 is an example block diagram of an LTE wireless communication system including the WTRU, the eNB, and the MME/S-GW.

FIG. 4 is an example block diagram of an LTE wireless communication system 300 including the WTRU 210, the eNB 220, and the MME/S-GW 230. As shown in FIG. 3, the WTRU 210, the eNB 220 and the MME/S-GW 230 are configured to perform a component carrier-specific reconfiguration in accordance with any embodiment disclosed herein. In addition to the components that may be found in a typical WTRU, the WTRU 210 includes a processor 316 with an optional linked memory 322, at least one transceiver 314, an optional battery 320, and an antenna 318. The processor 316 is configured to perform a component carrier-specific reconfiguration in accordance with any embodiment disclosed herein. The transceiver 314 is in communication with the processor 316 and the antenna 318 to facilitate the transmission and reception of wireless communications. In case a battery 320 is used in the WTRU 210, it powers the transceiver 314 and the processor 316.

In addition to the components that may be found in a typical eNB, the eNB 220 includes a processor 317 with an optional linked memory 315, transceivers 319, and antennas 321. The processor 317 is configured to perform and support a component carrier-specific reconfiguration in accordance with any embodiment disclosed herein. The transceivers 319 are in communication with the processor 317 and antennas 321 to facilitate the transmission and reception of wireless communications. The eNB 220 is connected to the Mobility Management Entity/Serving GateWay (MME/S-GW) 230 which includes a processor 333 with an optional linked memory 334.

Figure 5:
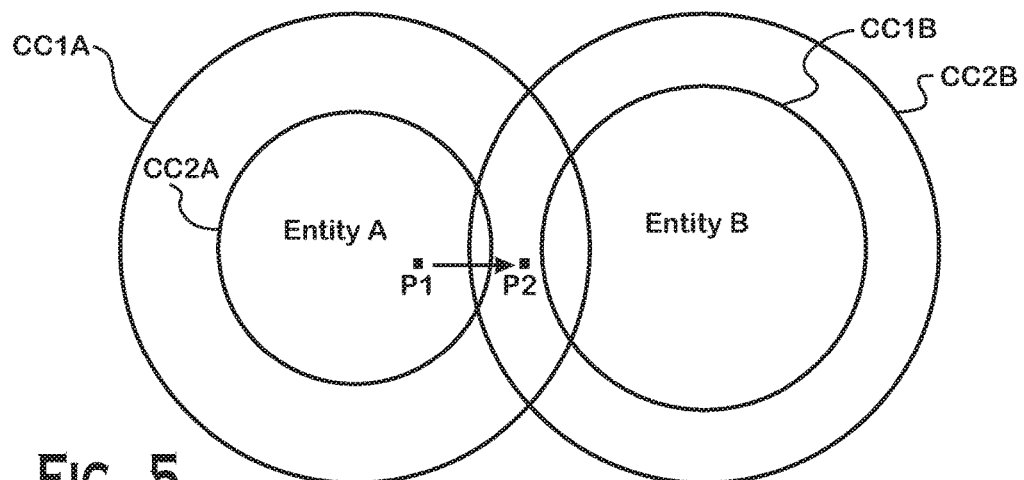
FIG. 5 illustrates the different cell patterns for different component carriers of two cells.

In accordance with one embodiment, a WTRU may perform component carrier-specific reconfiguration (i.e., adding, removing, or replacing a component carrier on a component carrier basis), such that a component carrier is added, removed, or replaced separately and independently. The transmit power of different carriers may be made to be different from component carrier to component carrier and from cell to cell. In that situation, a different 'cell' pattern, (i.e., "cell-edge" pattern), may be established for each component carrier frequency. FIG. 5 illustrates approximately the different component carrier boundaries. In FIG. 5, component carrier 1A is transmitted with a greater power than component carrier 2A from entity A and component carrier 2B if transmitted with a greater power than component carrier 1B from entity B that are controlled by the same or different eNB(s). Different per-component carrier cell edge boundaries may be defined for component carriers 1A, 2A, 1B, and 2B, respectively. In that case, the WTRU may not be at the boundary of component carrier 1A and component carrier 2A simultaneously and therefore may not experience overall cell-edge conditions at any location on the line shown.

At P1, the WTRU may be connected to component carriers 1A and 2A. When the WTRU moves from P1 to P2, the WTRU is out of component carrier 2A boundary and enters into the component carrier 2B boundary. In this situation, the WTRU may have better overall achievable data rates if the WTRU is receiving data via component carrier 1A and component carrier 2B. A mechanism used to change a subset of component carrier(s) while maintaining a connection for at least one component carrier as shown in FIG. 5 is referred to component carrier-specific reconfiguration (or component carrier-specific handover). Instead of switching component carriers, a new component carrier may be added, or a currently configured component carrier may be removed or replaced with another component carrier.

Figure 6A:
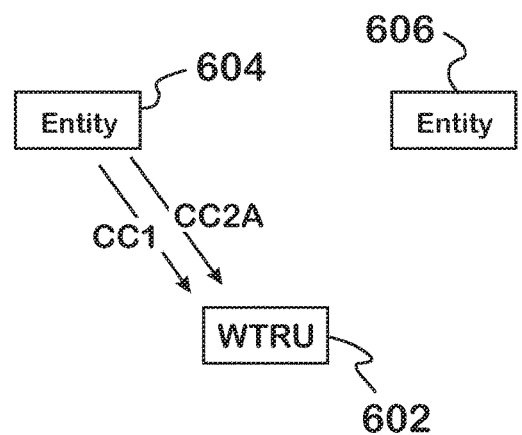
FIGS. 6A and 6B show an example component carrier-specific handover in accordance with one embodiment.
Figure 6B:
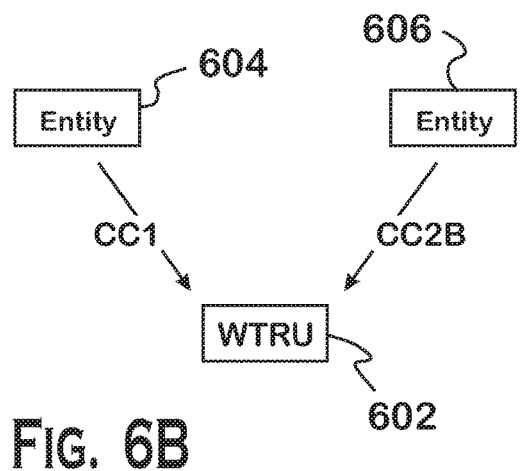

FIGS. 6A and 6B show an example component carrier-specific reconfiguration in accordance with one embodiment. FIG. 6A shows before component carrier reconfiguration and FIG. 6B shows after component carrier reconfiguration. In FIG. 6A, WTRU 602 receives transmission from entity 604 on component carriers 1 and 2A. Entities 604 and 606 may be controlled by the same eNB or different eNBs. As the component carrier reconfiguration trigger occurs for component carrier 2A, (e.g., signal quality of component carrier 2B from entity 606 becomes better than signal quality of component carrier 2A from entity 604 by a configured threshold), WTRU 602 performs a component carrier reconfiguration, which may or may not comprise a handover procedure, as shown in FIG. 6B. After the component carrier-specific reconfiguration, WTRU 602 receives transmissions via component carrier 1 and component carrier 2B from two entities 604, 606. It should be noted that FIGS. 6A and 6B show downlink component carriers as an example, and the reconfigured component carrier may be a DL component carrier, an UL component carrier, or both. While FIGS. 6A and 6B show two DL component carriers, it should be noted that the embodiment may be applied to any number of component carriers.

The component carrier-specific reconfiguration may be performed for uplink and downlink independently. FIGS. 7A and 7B show another example component carrier-specific reconfiguration, which may or may not comprise a handover procedure in accordance with another embodiment. FIG. 7A shows before component carrier reconfiguration and FIG. 7B shows after component carrier reconfiguration. In FIG. 7A, WTRU 702 receives from entity 704 on DL component carrier 1 and UL component carrier 2A. Entities 704 and 706 may be controlled by the same eNB or different eNBs. As a trigger occurs for UL component carrier 2A, WTRU 702 performs a component carrier reconfiguration such that UL component carrier 2A is removed and UL component carrier 2B is added, as shown in FIG. 7B. UL component carrier 1 remains the same since a trigger for UL component carrier 1 has not occurred. After the component carrier-specific reconfiguration (or handover), WTRU 702 receives on DL component carrier 1 and transmits over UL component carrier 2B.

The component carrier-specific reconfiguration may be performed within a cell, (i.e., adding, removing, or replacing a component carrier within a cell). In this case, the component carrier reconfiguration procedure is performed to change the set of UL and/or DL component carriers in a cell. This procedure may be used to swap either a UL component carrier (or a set of UL component carriers), and/or a DL component carrier (or a set of DL component carriers). This may be performed as a DL handover or UL handover where just the physical UL channel(s) or physical DL channel(s), (e.g., physical uplink shared channel (PUSCH)/physical uplink control channel (PUCCH) or physical downlink shared channel (PDSCH)/physical downlink control channel (PDCCH)), may be reassigned to a new component carrier within the same cell.

When a WTRU is located at the boundary between cells (including sectors) controlled by the same eNB, the best cell according to signal strength and/or channel quality criteria may vary dynamically. If the cells are assigned different pairs of UL/DL carriers, and if the WTRU transmits a PUCCH and a PUSCH separately on each component carrier, the eNB may make optimized UL/DL scheduling decisions for the WTRU based on the channel status reports and sounding reference signals (SRS) received via both cells (or sectors), regardless of whether the PDCCH is received from a single component carrier or single cell (or sector), or separately from each component carrier or cell (or sector).

In accordance with one embodiment, non-overlapping discontinuous transmission (DTX) and/or non-overlapping discontinuous reception (DRX) patterns may be defined for each of the component carriers. This scheme may minimize the peak-to-average ratio of UL transmissions caused by the simultaneous PUCCH or PUSCH transmissions on the UL carriers. While this would have the effect of limiting the peak data rates, the WTRU and the eNB may still benefit with this scheme by selecting the best component carrier(s) within a given time frame especially (but not limited to) in case where the pairs of UL/DL carriers are controlled by the same eNB. For example, when an eNB knows that in given time frames certain components carriers are transmitted at higher or lower powers at different sites (thus making the component carrier boundaries different in different time frames) the WTRU may be appropriately scheduled for DTX/DRX based on component carrier-boundaries in each such time frame. The non-overlapping DTX/DRX patterns may also be beneficial even if the pairs of UL/DL carriers are operated in the same cell (or sector), as the channel quality generally varies dynamically and is different between the pairs of carriers. This mode of operation may be activated through an RRC message, (e.g., a handover command or other reconfiguration command).

The per-component carrier-DTX/DRX operation disclosed above is separate from the DTX/DRX operation defined in a medium access control (MAC) layer in LTE. With the DRX operation in accordance with the above embodiment, the WTRU may not be able to receive a downlink channel, (e.g., PDSCH), for a certain period of time on a certain component carrier(s) regardless of the MAC layer DRX parameters, (e.g., inactivity timers, etc.), defined in the current LTE specification. The MAC layer DRX operation described in the current LTE specification may co-exist with the per-component carrier DRX operation in accordance with this embodiment. In that case, the downlink channel, (e.g., PDSCH), may not be received in a larger set of sub-frames than what would be received based on the currently specified MAC layer DRX operation.

In accordance with the per-component carrier-DTX/DRX operation disclosed above, cells may be permitted to be time-multiplexed within the same component carrier and the best component carrier(s) may be selected within a given time frame for the WTRU. FIG. 8 shows an example per-component carrier-DTX/DRX operation in accordance with one embodiment. For example, in even-numbered frames, cell A may transmit component carrier CC1A and cell B may transmit component carrier CC2B, and in odd-numbered frames, cell A may transmit component carrier CC2A and cell B may transmit component carrier CC1B, as shown in FIG. 8. The DRX/DTX periods for the WTRU may be set such that the DRX/DTX period for a given component carrier and cell corresponds to the time when that cell is not transmitting that component carrier. It should be noted that the cells described may also be independent component carriers of a common cell.

More generally, instead of turning on and off the component carriers, the transmit powers may be changed in different time frames. FIG. 9 shows another example per-component carrier-DTX/DRX operation in accordance with another embodiment. For example, the power used for component carrier CC2A may be smaller than the power used for component carrier CC1A at cell A, and the power used for component carrier CC1B may be smaller than the power used for component carrier CC2B at cell B in even-numbered frames, and the power used for component carrier CC1A may be smaller than the power used for component carrier CC2A at cell A, and the power used for component carrier CC2B may be smaller than the power used for component carrier CC1B at cell B in odd-numbered frames. The DRX/DTX periods at the WTRU may be set such that in even-numbered frames, the WTRU is in DRX/DTX in CC2A for cell A and DRX/DTX in CC1B for cell B and the opposite in odd-numbered frames.

The component carrier-specific reconfiguration (or handover) may be performed in case coordinated multiple point transmission (CoMP) is implemented. CoMP is a transmission and reception scheme that a WTRU may receive simultaneous transmissions from multiple cells or have transmissions coordinated over multiple cells (such as coordinated beamforming or coordinated scheduling) and/or the WTRU transmissions may be received at multiple cells in a coordinated way to improve performance and avoid or reduce inter-cell interference. In accordance with one CoMP scheme, scheduling may be dynamically coordinated across the cells to control and reduce the interference between different transmissions. In accordance with another CoMP scheme, the transmissions to the WTRU may be transmitted simultaneously from multiple transmission points and the multi-point transmissions may be coordinated as a single transmitter with antennas that are geographically separated.

In implementing the component carrier aggregation, control channels, (e.g., PDCCHs), for multiple component carriers may be separately coded into separate messages and separately transmitted via each corresponding DL component carrier. This scheme is referred to as "separate coding separate transmission." Alternatively, the control channels, (e.g., PDCCHs), may be separately coded into separate messages and all the messages may be jointly transmitted via one DL component carrier (DL anchor component carrier) from one cell. This scheme is referred to as "separate coding joint transmission." Alternatively, the control channels, (e.g., PDCCHs), may be jointly coded into one message and transmitted via one DL component carrier (anchor component carrier) from one cell. This scheme is referred to as "joint coding joint transmission." DL shared channel(s), (e.g., PDSCH(s)), may be transmitted from multiple cells per component carrier and UL shared channel(s), (e.g., PUSCH(s)), may be received at multiple cells per component carrier.

In CoMP, when a joint transmission scheme is used (i.e., separate coding joint transmission or joint coding joint transmission), a WTRU may receive a PDCCH from a single cell, (i.e., anchor cell), while receiving PDSCHs from, or transmitting PUSCHs to, multiple cooperating cells in an active CoMP set. In accordance with one embodiment, in case where a joint transmission scheme is used, (i.e., separate coding joint transmission or joint coding joint transmission), a component carrier carrying the PDCCH may be handed over to a target cell, but a component carrier(s) for PDSCH and/or PUSCH may not be handed over to the target cell. In the case of non-joint transmission CoMP, not all the PDSCH links may actually carry data for the WTRU, but rather coordinated scheduling or coordinated beamforming may be used between the cells.

FIGS. 10A and 10B show an example component carrier-specific reconfiguration (or handover) when DL CoMP is implemented in accordance with one embodiment. FIG. 10A shows before component carrier reconfiguration and FIG. 10B shows after component carrier reconfiguration. In FIG. 10A, WTRU 1002 receives downlink transmissions from cell 1004 on component carriers 1A and 2A and from cell 1006 on component carriers 1B and 2B. Cells 1004 and 1006 may be controlled by the same eNB or different eNBs. Cell 1004 is currently an anchor cell (a cell sending a PDCCH for the DL and/or UL transmissions), so that WTRU 1002 receives a PDCCH from cell 1004 on component carrier 1A.

WTRU 1002 may not know that from which cell it is receiving the PDSCH transmissions. As the trigger occurs with respect to component carrier 1A in cell 1004, WTRU 1002 performs a handover of PDCCH from component carrier 1A to component carrier 1B in cell 1006, but not PDSCH, as shown in FIG. 10B. It should be noted that FIGS. 10A and 10B show handover in DL CoMP as an example, and the same may be applied to UL CoMP. In the case of non-joint transmission CoMP, not all the PDSCH links shown in FIGS. 10A and 10B may actually carry data for the WTRU at a given time, but coordinated scheduling or coordinated beamforming may be used between the cells, (e.g., cell 1004 transmits on CC1 and cell 1006 transmits on CC2 at the given time). It should be noted that FIGS. 10A and 10B show switching a channel from one cell to another, but it may be performed within the same cell.

If a PDSCH(s) from multiple cells may not be received at the WTRU, the component carrier-specific handover for the PDSCH may also be performed. Similarly, if a PUSCH(s) cannot be received at multiple cells, the component carrier-specific handover for PUSCH may also be performed. Alternatively or additionally, an UL anchor component carrier carrying a PUCCH(s) may also be configured for the WTRU along with the DL anchor component carrier carrying a PDCCH(s), and the component carrier-specific handover may be performed for either the DL anchor component carrier, or the UL anchor component carrier, or both.

In accordance with another embodiment, when the WTRU is aware of the active COMP set, (i.e., the cells from which the WTRU is receiving the PDSCH transmissions or to which the WTRU is transmitting the PUSCH transmissions), the WTRU may perform the component carrier-specific handover or reconfiguration for the PDSCH and/or PUSCH, independently from a PDCCH and/or a PUCCH. This is the case where the active CoMP set needs to be changed for the WTRU, but the current anchor cell (for UL and/or DL) in the active CoMP set is not changed, so that the WTRU still receives a PDCCH from the same anchor cell or transmits a PUCCH to the same anchor cell.

Figure 11A:
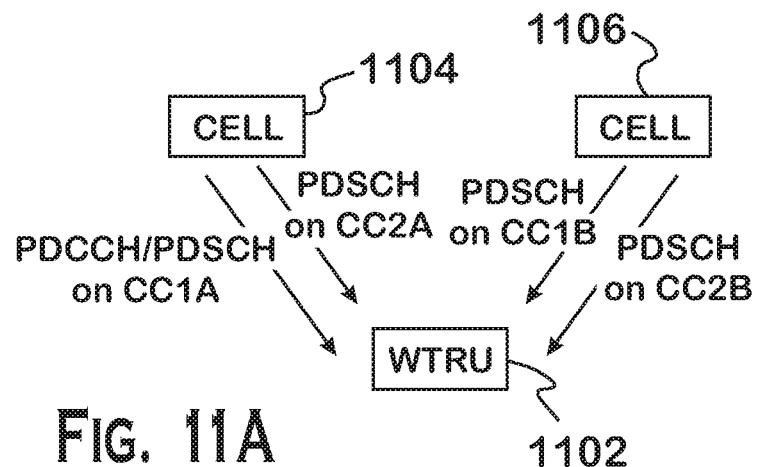
FIGS. 11A and 11B show an example component carrier-specific handover when CoMP is implemented in accordance with another embodiment.
Figure 11B:
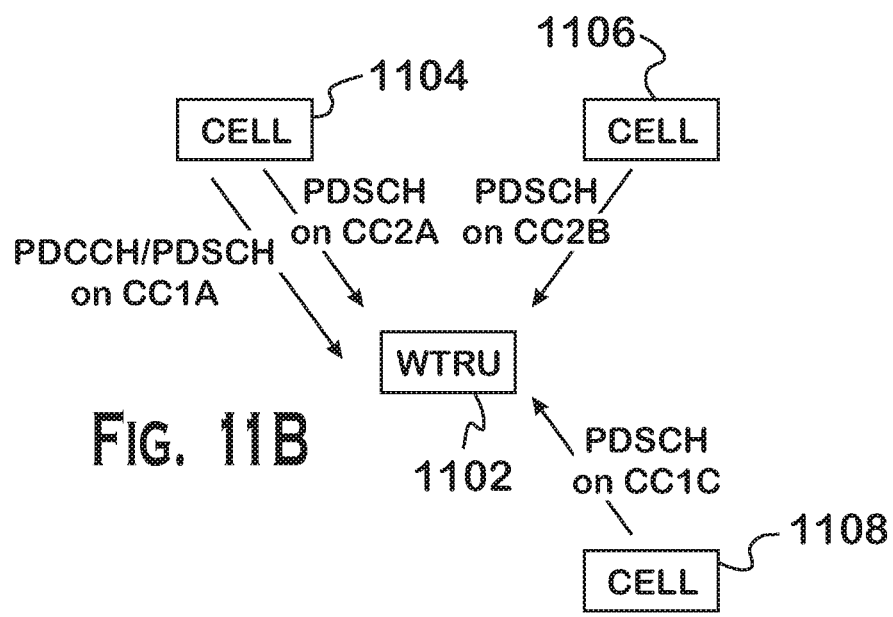

FIGS. 11A and 11B show an example component carrier-specific reconfiguration when DL CoMP is implemented in accordance with this alternative embodiment. FIG. 11A shows before component carrier reconfiguration and FIG. 11B shows after component carrier reconfiguration. In FIG. 11A, WTRU 1102 receives downlink transmissions from cell 1104 on component carriers 1A and 2A and from cell 1106 on component carriers 1B and 2B. Cells 1104, 1106, 1108 may be controlled by the same eNB or different eNBs. Cell 1104 is currently an anchor cell (a cell sending a PDCCH for the DL and/or UL transmissions), so that WTRU 1102 receives a PDCCH from cell 1104 on component carrier 1A. As the handover trigger occurs with respect to component carrier 1B in cell 1106, WTRU 1102 performs a handover of PDSCH from component carrier 1B to component carrier 1C in cell 1108, as shown in FIG. 11B while cell 1104 remains the anchor cell. It should be noted that FIGS. 11A and 11B show handover in DL CoMP as an example, and the same may be applied to UL CoMP. It should be noted that FIGS. 11A and 11B show switching a channel from one cell to another, but it may be performed within the same cell.

In order to support the component carrier-specific reconfiguration or handover, (i.e., adding, removing or replacing at least one component carrier within the same cell or between cells), the WTRU may report measurements to the network. The measurement may be any type of measurement relevant to evaluating the channel quality including, but not limited to, received signal code power (RSCP), reference signal received power (RSRP), signal-to-interference and noise ratio (SINR), reference signal received quality (RSRQ), or the like.

The WTRU may report component carrier-specific measurement of serving cell and/or neighboring cells, (e.g., measurement of every downlink component carrier or a subset of carriers, or the best measurement of serving cell and/or neighboring cells); measurement of the anchor component carrier of both serving cell and/or neighboring cells; weighted average measurement of all aggregated downlink carriers of serving cell and/or neighboring cells, or the like.

The WTRU may report the measurements to the network to trigger component carrier reconfiguration or handover when the measurement of the serving cell is worse than the corresponding measurement of the neighboring cells by a preconfigured threshold. The threshold may be configurable. When the WTRU reports the measurement, the WTRU may sort the carriers and/or cells according to measurement values. The WTRU may be configured to periodically report the measurement of any detected component carrier.

Scrambling codes may be designed such that signals from adjacent cells may have quasi-orthogonality. In this case, the component carrier reconfiguration or handover may be prioritized to the cell that exhibits a better orthogonality of the scrambling codes, and the scrambling code orthogonality metric may be considered as an additional measure for handover.

In CoMP, the WTRU may report the measurements (or a subset of them) to the network when the measurement (or some of measurements or a composite measurement) of the anchor cell is worse than the corresponding measurement(s) of the non-anchor cell(s) in the active CoMP set or the neighboring cells by a predefined threshold. This report may be used for PDCCH handover. The WTRU may report the measurements (or a subset of them) to the network when the measurements (or some of measurements or a composite measurement) of the cells in the active CoMP set are worse than the corresponding measurements of the neighboring cells by a predefined threshold. This reporting may be used for PDSCH handover. The above thresholds may be configurable.

Since with component carrier-specific reconfiguration or handover, (i.e., adding, removing or replacing at least one component carrier within the same cell or between cells), the WTRU may be connected to more than one cells/eNBs at the same time, proper RRC signaling is needed to support it. In accordance with one embodiment, RRC signaling to configure a split RRC connection between a source cell and a target cell may be provided. A new (or modified) type of RRC connection reconfiguration signaling may be defined including physical channel configuration. The RRC connection reconfiguration signaling may include for the source cell and the target cell the following: PUCCH configuration, PUSCH configuration, sounding reference signal (SRS) configuration, uplink power control configuration, transmit power control (TPC)-PDCCH configuration for PUCCH, TPC-PDCCH configuration for PUSCH, channel quality indication (CQI) or channel state information (CSI) reporting configuration, PDCCH search space configuration, assignment of the DL and/or UL anchor component carrier, assignment of specific preamble configurations, per-component carrier DTX/DRX pattern configuration, (e.g., set of sub-frames where PUCCH and PUSCH transmission is allowed), or the like.

The RRC configuration may be made with regard to a group of carriers in the source cell and a group of carriers in the target cell. Alternatively, the RRC configuration may be made for each component carrier in the source and target cells.

The new or modified RRC message may include parameters for a number of component carriers, and the WTRU may try to perform component carrier reconfiguration, or handover to the component carriers, in the order indicated in the RRC message. When the WTRU successfully performs a component carrier reconfiguration or handover to a particular component carrier the WTRU may send a component carrier reconfiguration or handover complete message via that component carrier. On the network side, the network may keep the resources on the component carriers indicated in the RRC message for the WTRU for a predefined period of time, after which the resources may be released.

Alternatively, instead of providing the WTRU with a group of component carriers in a particular order, the network may provide the WTRU two (2) groups of component carriers: one group with a dedicated random access channel (RACH) preamble(s) and the other group with a contention based RACH preamble(s). The WTRU may pick a component carrier on which the WTRU wants to initiate the handover. The WTRU may first select a component carrier from the group with a dedicated RACH preamble(s).

Optionally, the RRC message may indicate a component carrier(s) to which the WTRU may fall back in case of handover failure. The RRC message may include a different set of RACH preambles for those carriers configured for fall back. In case of handover failure, the WTRU may look for those carriers as listed in the RRC message and try to re-establish a connection on them.

To simplify the configuration and handover procedure, the configurations on the source component carrier subset may be transferred to the target component carrier subset, especially in the case of intra-cell component carrier-specific reconfiguration where the subset of UL and/or DL component carriers are switched within the same cell. This may also be applied to inter-cell handover.

If the WTRU has one or more component carrier that was already handed over to the target cell, the WTRU may not need to perform any extra step to acquire the MIB and SIB information of the target cell since the WTRU already obtained the MIB and SIB information of the target cell. If the WTRU does not have any component carrier that was handed over to the target cell, the WTRU needs to acquire the MIB and SIB information of the target cell.

In accordance with one embodiment, the source cell may signal all MIB parameters and important SIB parameters of the target cell to the WTRU in the handover command. Alternatively, the WTRU may acquire the MIB and all or some of SIBs of the target cell that are required to perform uplink transmission (such as RACH, PUSCH/PUCCH) before handover. Alternatively, the WTRU may acquire the MIB and all or some of SIBs of the target cell that are required to perform uplink transmission (such as RACH, PUSCH/PUCCH) after receiving the handover command but before performing a random access in the target cell. Alternatively, the WTRU may perform the handover procedure to the target cell, and after successful handover, the WTRU may acquire the MIB and SIB of the target cell.

Embodiments for random access in component carrier-specific reconfiguration are disclosed hereafter. While a WTRU is performing a random access on one or several of UL component carriers in the target cell, the WTRU may continue its normal operation in the source cell. The WTRU may perform a random access in the target cell as part of the component carrier reconfiguration or handover procedure for the first component carrier that needs to be handed over to the target cell. After a successful component carrier reconfiguration or handover of the first component carrier to the target cell, the WTRU may not perform the random access procedure in the target cell for the handover of the remaining component carriers to the target cell since the RRC connection in the target cell has been established and uplink timing is aligned (i.e., synchronized).

In case a WTRU has a single radio capability, the WTRU may perform the component carrier-specific reconfiguration or handover of a component carrier(s) by exploiting the inactivity period of the DRX cycle, (i.e., opportunity of DRX period), on other component carrier(s) to initiate a RACH procedure with the target cell, while maintaining uplink and downlink operation and connection with the source cell. As described above, the non-overlapping DRX and/or DTX patterns may be configured for the component carriers.

Figure 12:
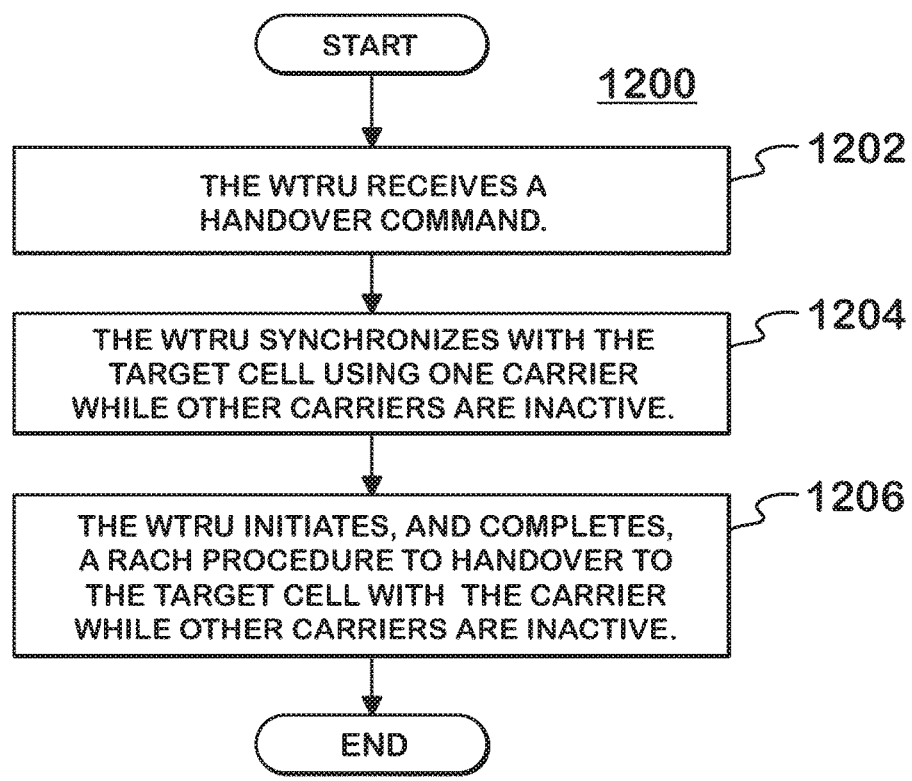
FIG. 12 is a flow diagram of an example process of RACH procedure in accordance with one embodiment.

FIG. 12 is a flow diagram of an example process 1200 of RACH procedure in accordance with one embodiment. For illustration, assuming that a WTRU is allocated with carriers 1D, 2D, and 3D in the downlink and carriers 1U, 2U, and 3U in the uplink. The WTRU receives a handover command, (e.g., RRC_connection_Reconfiguration message with mobility information) (step 1202). Assume that the handover command is received on component carrier 1D during its on-time duration. Since non overlapping DRX cycle may be configured for the component carriers, other component carriers (i.e., carriers 2D and 3D) may be inactive, (i.e., opportunity to DRX), during that time period. After receiving the handover command, the WTRU synchronizes with the target cell while component carrier 2D, 3D and component carrier 2U and 3U are inactive (step 1204). The WTRU may initiate a RACH procedure to handover to the target cell with carriers 1U and 1D while component carriers 2D and 3D and component carriers 2U and 3U are inactive (step 1206). The WTRU may complete the component carrier reconfiguration or handover procedure with the target cell by using component carrier 1U and component carrier 1D while carriers 2D, 3D and carriers 2U and 3U are inactive. Alternatively, certain steps of the RACH procedure may be provided with a higher priority than the on-duration time of the other carriers not involved in the RACH procedure.

In case of the component carrier-specific RACH procedure failure, the WTRU may inform the source eNB of the failure with an RRC message using one of the still configured UL carriers (e.g., component carrier 2U or 3U).

In case of success of the component carrier-specific RACH procedure, the WTRU may receive from the target cell an RRC_Connection_Reconfiguration requesting the WTRU to reconfigure the other component carrier(s) that are still configured with the source cell. As disclosed above, the procedure to reconfigure the remaining component carriers may not be performed through a RACH procedure since the WTRU is synchronized with the target cell and obtained the necessary information.

Alternatively, the WTRU may maintain a subset of carriers (e.g., component carrier 1D and 1U) with the target cell while maintaining another subset of carriers (e.g., component carrier 2D, 3D, 2U, 3U) with the source cell.

In case a WTRU has a dual radio capability, the WTRU may initiate a RACH procedure on a subset of carriers (component carrier 1D, 1U in the above example) with the target cell while maintaining the connection with the source cell on the other carriers without the need of exploiting DRX inactivity. With the dual radio capability of the WTRU, the DRX patterns on the component carriers may overlap.

An UL anchor component carrier carrying PUCCHs may also be defined similar to DL carriers carrying PDCCHs. In this case the RACH procedure may be restricted to the assigned UL anchor component carrier.

The WTRU may handover to both an LTE-A cell and a WCDMA cell at the same time. For example, a LTE 5 MHz component carrier and a WCDMA 5 MHz component carrier, (or any other different system component carrier), may be aggregated.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

What is claimed is:

1. A method, implemented in a wireless transmit/receive unit (WTRU), the method comprising:
   the WTRU receiving a single radio resource control (RRC) connection reconfiguration request, the single RRC connection reconfiguration request including individually, for each of a plurality of cells, physical configuration information, wherein one of the plurality of cells is a primary cell and other cells of the plurality of cells are non-primary cells; and
   the WTRU sending a measurement report on a condition that a neighboring cell is better than a non-primary cell by an amount.

2. The method of claim 1, further comprising:
   the WTRU communicating with the plurality of cells using cooperative multipoint communication (CoMP).

3. The method claim 1, wherein the measurement report is based on at least one measurement related to channel quality.

4. The method of claim 1, wherein the physical configuration information includes at least one of a physical uplink control channel (PUCCH) configuration or a physical uplink shared channel (PUSCH) configuration.

5. A wireless transmit/receive unit (WTRU) comprising:
   a processor; and
   a transceiver,
   the processor and the transceiver configured to receive a single radio resource control (RRC) connection reconfiguration request, the single RRC connection reconfiguration request including individually, for each of a plurality of cells, physical configuration information, wherein one of the plurality of cells is a primary cell and other cells of the plurality of cells are non-primary cells, and
   the processor and the transceiver further configured to send a measurement report on a condition that a neighboring cell is better than a non-primary cell by an amount.

6. The WTRU of claim 5,
   the processor further configured to control the WTRU to communicate with the plurality of cells using cooperative multipoint communication (CoMP).

7. The WTRU of claim 5, wherein the measurement report is based on at least one measurement related to channel quality.

8. The WTRU of claim 5, wherein the physical configuration information includes at least one of a physical uplink control channel (PUCCH) configuration or a physical uplink shared channel (PUSCH) configuration.

9. The WTRU of claim 5, the transceiver further configured to send the measurement report.

10. The WTRU of claim 5, further comprising an antenna, in communication with the transceiver, configured to send and receive radio frequency (RF) communications.

11. A base station comprising:
    a processor; and
    a transceiver,
    the processor and the transceiver configured to send a single radio resource control (RRC) connection reconfiguration request, the single RRC connection reconfiguration request including individually, for each of a plurality of cells, physical configuration information, wherein one of the plurality of cells is a primary cell and other cells of the plurality of cells are non-primary cells, and
    the processor and the transceiver further configured to send measurement configuration information that configures a wireless transmit/receive unit (WTRU) to send a measurement report on a condition that a neighboring cell is better than a non-primary cell by an amount.

12. The base station of claim 11, wherein the measurement report is based on at least one measurement related to channel quality.

13. The base station of claim 11, wherein the physical configuration information includes at least one of a physical uplink control channel (PUCCH) configuration or a physical uplink shared channel (PUSCH) configuration.

* * * * *